(12) United States Patent
Gedenk

(10) Patent No.: US 7,731,253 B2
(45) Date of Patent: Jun. 8, 2010

(54) RUBBER-SPRUNG RAIL WHEEL

(75) Inventor: Volker Gedenk, Hemmingen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 76 days.

(21) Appl. No.: 11/793,829

(22) PCT Filed: Nov. 19, 2005

(86) PCT No.: PCT/EP2005/012403

§ 371 (c)(1),
(2), (4) Date: Jun. 22, 2007

(87) PCT Pub. No.: WO2006/072278

PCT Pub. Date: Jul. 13, 2006

(65) Prior Publication Data

US 2007/0273168 A1    Nov. 29, 2007

(30) Foreign Application Priority Data

Dec. 22, 2004 (DE) ................... 10 2004 061 652

(51) Int. Cl.
*B60B 17/00* (2006.01)
(52) U.S. Cl. ........................................ 295/11
(58) Field of Classification Search .......... 295/7, 295/11, 23–24; 152/17–18, 40–41, 47–49
See application file for complete search history.

(56) References Cited

U.S. PATENT DOCUMENTS 1,982,043 A * 11/1934 Brownyer ................. 295/11
2,074,341 A * 3/1937 Piron ....................... 295/11
2,175,118 A * 10/1939 Hirshfeld ................. 295/11
2,911,252 A * 11/1959 Templeton ................ 295/11
2,954,259 A * 9/1960 Kordes .................... 295/11
6,312,033 B1 11/2001 Engstler

FOREIGN PATENT DOCUMENTS

| DE | 594792 | 3/1934 |
|---|---|---|
| DE | 675516 | 5/1939 |
| DE | 24 06 206 | 8/1975 |
| DE | 32 01 499 | 8/1983 |
| DE | 44 30 342 | 8/1995 |
| WO | WO 94/15801 | 7/1994 |

* cited by examiner

*Primary Examiner*—Jason R Bellinger
(74) *Attorney, Agent, or Firm*—Walter Ottesen

(57) ABSTRACT

The invention relates to a rubber-sprung rail wheel having a wheel tire (1), which has a peripherally-extending web (3) on the inner side (2) thereof, and a wheel rim (4) provided with two legs (6, 7) on the outer side (5) thereof, and two rubber rings (8, 9) that are arranged between the wheel tire (1) and the wheel rim (4). The rubber rings (8, 9) are arranged on both sides of the web (3) and are laterally delimited by the legs (6, 7). A first gap (12) is formed between the inner side (2) of the wheel tire (1) and the end edges (10, 11) of the legs (6, 7) and the rubber rings (8, 9) and a second gap (12) is formed between the outer side (5) of the wheel rim (4) and the end edges (13, 14) of the web (3) and the rubber rings (8, 9). The web (3) and the legs (6, 7) are configured in such a way that the rubber rings (8, 9) are inclined with respect to the central plane of the web (3). According to the invention, the rubber rings respectively have a conically expanded region on the inner diameter (14) and outer diameter (11), and a region having a constant wall thickness between the expanded regions.

7 Claims, 1 Drawing Sheet

RUBBER-SPRUNG RAIL WHEEL

RELATED APPLICATIONS

This application is the national stage of PCT/EP 2005/012403, filed Nov. 19, 2005, designating the United States and claiming priority from German patent application no. 10 2004 061 652.3, filed Dec. 22, 2004, the entire contents of which are incorporated herein by reference.

FIELD OF THE INVENTION

The invention relates to a rubber-sprung rail wheel

BACKGROUND OF THE INVENTION

Rubber-sprung rail wheels of this kind are known in diverse embodiments, for example, from DE-PS 594 792, DE 32 01 499 A1 or DE 24 06 206 A1.

The disadvantage of the usual rubber-sprung rail wheels used in the manufacture of rail vehicles is that these deflect only a maximum of 1 mm in radial direction. However, a deflection of up to 5 mm is desired under the same load.

Highly elastic rail wheels purely with thrust load or with superposed thrust and pressure loads are likewise known. For example, a rail wheel is known from U.S. Pat. No. 6,312,033 wherein the rubber ring is loaded vertically and in thrust so that the rubber ring takes up a high radial deflection.

However, it is disadvantageous with respect to known highly elastic rail wheels that their durability is not satisfactory. In addition to the vertical load because of the weight of the vehicle, a lateral transverse force acts additionally on the rubber body. In the static state, this force effects a cardanic tilting of the rail wheel and the center of rotation is disposed one-third above the center point of the wheel. In the traveling state, the tilting changes continuously over the periphery. In this way, a high peripheral edge pressing arises at the outer diameter of the wheel which destroys the rubber body or rubber ring in a relatively short time.

In order to reduce the edge pressing, it has been shown to be advantageous to increase the wall thickness of the rubber rings. However, for small wheels such as are used in street cars, this is not adequately possible. It is furthermore disadvantageous that the rings deflect too greatly because of the larger wall thicknesses with the technically usable rubber hardness. The intense deflection can be compensated by superposing thrust loads and pressure loads in the rubber body, for example, by placing the rubber rings at an angle. However, the edge pressing is again increased and the service life of the rubber body is further deteriorated. The reasons against a continuous conical configuration of the rubber ring is that the structural space for an overall satisfactory wall thickness is mostly not sufficient.

For the deflection, it is therefore advantageous to have a narrow wall thickness of the rubber rings but for the edge pressing, the wall thickness should be as large as possible.

SUMMARY OF THE INVENTION

The invention therefore is based on the task of further developing a rail wheel of the above-mentioned type in such a manner that it has an improved service life while maintaining the high-elastic characteristics.

In a rubber-sprung rail wheel of the invention, this task is solved in that the rail wheel has at least one rubber ring which has a conically widened region at the inner diameter and at the outer diameter and a region having uniform wall thickness between the expanded regions.

A stiffer configuration of the rail wheels is obtained with the arrangement of the rubber rings inclined to the center plane of the web. At the same time, a lesser edge pressing is achievable via the conical expansion.

With the conical expansion of the rubber rings, the possibility exists to partially increase the wall thickness of the rubber rings in order to so achieve a reduction of the edge pressure. The disadvantages connected with the increase of the wall thickness of a rubber ring are in any event, partially compensated. The disadvantages are that the rubber rings become too soft with increasing wall thickness in the rubber hardness which is technically usable and thereby the service life of these rubber rings is reduced. In this way, the absorption of the shocks and hits which act from the track and on the rail wheel is significantly improved with respect to the state of the art.

A further embodiment of the invention provides that the web, starting from the inner side of the wheel tire, has a cross section which tapers in a direction toward the outer side of the wheel rim and/or that the legs, starting from the outer side of the wheel rim, have a cross section which tapers in a direction to the inner side of the wheel tire.

An advantageous configuration of the invention provides that the web, the legs and the rubber rings are so configured that peripherally-extending regions of the rubber rings, which close with the end edges, exhibit an expanded cross section in the direction of their end edges.

With this contour optimization of the rubber rings, an essentially larger vertical stiffness is achieved while simultaneously achieving a significantly lesser edge pressing.

Especially for small rail wheels, which are used, for example, in street car manufacture, an increase of the wall thickness, which is wanted for a reduction of the edge pressing, is not possible over the entire rubber ring. With the configuration of the invention of the rubber rings, a significant reduction of the edge pressing is achieved also for these rail wheels.

An increase of the wall thickness over the entire rubber ring would have furthermore the disadvantage that the rubber rings would become too soft for the technically usable rubber hardnesses and the service life of these rubber rings would likewise decrease.

Advantageously, in the configuration of the invention, a reduced load of the rubber rings is obtained by the combination of pressure and thrust superposition and a greater dynamic durability with a longer service life of the rubber rings. Preferably, the cross section of the web corresponds essentially to the cross section of an obelisk and the cross section of the legs corresponds essentially to the cross section of half of an obelisk partitioned in the longitudinal direction. The tip of the obelisk is preferably flattened.

Furthermore, the legs and the rubber rings are arranged mirror symmetrically to the center plane. In this way, an adequate symmetrically high axial stiffness of the rail wheel is given.

Practically, in a further embodiment of the invention, the rubber rings are vulcanized to the web of the wheel tire.

In this way, a significant alleviation is achieved during assembly of the rail wheel of the invention and, at the same time, a precise positioning of the rubber rings in the rail wheel is determined and ensured. A uniform quality of the manufactured rail wheels is guaranteed.

Advantageously, one of the legs of the wheel rim is formed by a wheel disc and the other leg of the wheel rim is formed by a rim ring. The rim ring is releasably attached to the wheel disc.

In this way, the rubber rings, which are mounted between the web and the legs, can be mounted with a pretensioning.

BRIEF DESCRIPTION OF THE DRAWING

In the following, the invention will be explained with reference to an embodiment which is shown in the drawing. In the drawing, the single

Figure 1:
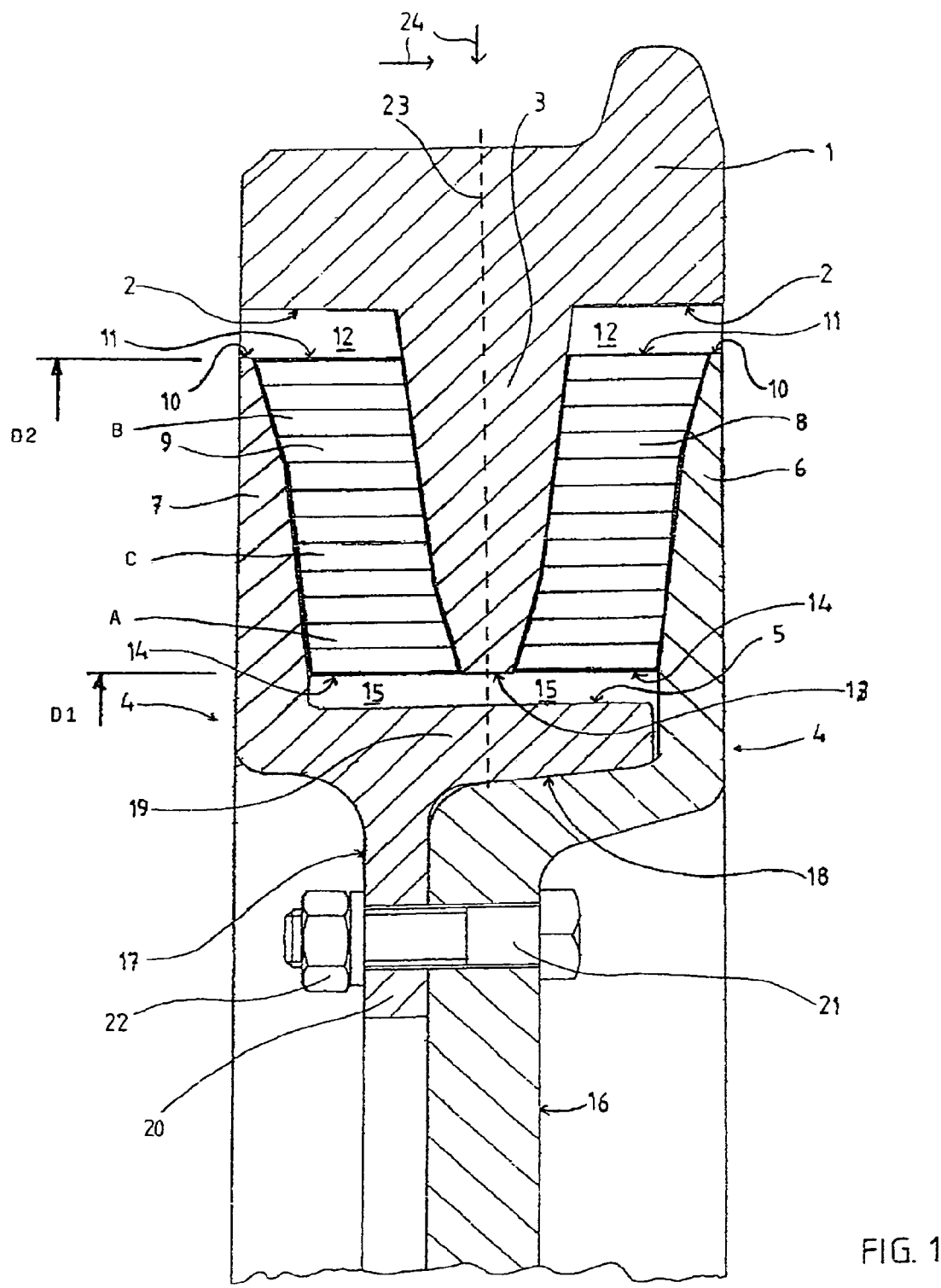
FIG. 1 shows a radial section of the rail wheel of the invention as a cutaway view.

DESCRIPTION OF THE PREFERRED
EMBODIMENTS OF THE INVENTION

The rubber-sprung rail wheel according to the invention receives load in the direction of arrows 24 and includes a wheel tire 1 which has a peripherally-extending web 3 on its inner side 2 and a wheel rim 4 which has two legs (6, 7) on its outer side 5.

The one leg 6 of the wheel rim 4 is formed by a wheel disc 16 and the other leg 7 of the wheel rim 4 is formed by a rim ring 17. The rim ring 17 is releasably attached to the wheel disc 16.

The leg 6 is formed on the wheel disc 16 while forming a support surface 18 for a peripherally-extending projection 19 of the rim ring 17. The support surface 18 extends in the axial direction and the projection 19 forms quasi the outer side 5 of the wheel rim 4. The wheel rim 4 is accordingly formed by the legs (6, 7) as well as by the peripherally-extending projection 19.

Two rubber rings (8, 9) are provided between the wheel tire 1 and the wheel rim 4. The rubber rings (8, 9) are mounted on respective sides of the web 3 and are laterally delimited by the legs (6, 7) of the wheel rim 4.

A first intermediate space 12 is formed between the inner side 2 of the wheel tire 1 and the end edges (10, 11) of the legs (6, 7) and the rubber rings (8, 9). A second intermediate space 15 is formed between the outer side 5 of the wheel rim 4 and the end edges (13, 14) of the web 3 and the rubber rings (8, 9).

When loads occur, the rubber rings (8, 9) can deform into the above-mentioned intermediate spaces (12, 15).

The rim ring 17 and the peripherally-extending projection 19 run in radial direction into a disc-shaped flange 20 which has bores that are brought into coincidence with bores of the wheel disc 16. The passed-through threaded bolts 21 and nuts 22 form the releasable connection between the rim ring 17 and the wheel disc 16.

Starting from the inner side 2 of the wheel tire 1 and according to the invention, the web 3 has a cross section which tapers in the direction of the outer side 5 or the projection 19 of the rear wheel rim 4 and the legs (6, 7) have a tapered cross section starting from the outer side 5 (or from the projection 19 of the wheel rim 4) in the direction of the inner side 2 of the wheel tire 1. Here, the cross section of the web 3 essentially corresponds to the cross section of an obelisk and the cross section of the legs (6, 7) corresponds essentially to the cross section of one-half of an obelisk partitioned in the longitudinal direction. In this way, the rubber rings (8, 9) are arranged inclined to the center plane 23 of the web 3.

Regions (A, B) of the rubber rings (8, 9) extend peripherally and end with end edges (11, 14). These regions (A, B) have a cross section which widens in the direction of the end edges (11, 14).

The rubber rings (8, 9) each have an inner diameter D1 and an outer diameter D2.

At least one of the rubber rings (8, 9) is subdivided into a first region A having a boundary 14 at the inner diameter D1 and a second region B having a boundary 11 at the outer diameter D2 and a mid region C disposed between the first and second regions (A, B).

The first and second regions (A, B) are each conically expanded regions and the mid region C has a uniform wall thickness.

The legs (6, 7) and the rubber rings (8, 9) are arranged mirror symmetrically to the center plane 23 of the web 3.

The elevation of the web 3 is so dimensioned that a spacing is maintained between the end edge 13 of the web 3 and the outer side 5 of the peripherally-extending projection 19 which faces toward the end edge 13. This spacing is greater than the distance between the end edges 10 of the legs (6, 7) and the inner side 2 of the wheel tire 1. For extremely high radial loads for which the end edges 10 of the legs (6, 7) are against the inner side 2 of the wheel tire 1, it is achieved that there is always an annular gap between the end edge 13 and the outer side 5 of the projection 19 with the outer side 5 lying opposite the end edge 13.

The invention claimed is:

1. A rubber-sprung rail wheel comprising:
   a wheel tire having an inner side and a peripherally-extending web formed on said inner side;
   said peripherally-extending web defining a center plane;
   a wheel rim having an outer side facing toward said wheel tire;
   said wheel rim further including two legs on said outer side and said legs having respective end edges;
   two rubber rings disposed on opposite sides of said web and being laterally delimited by corresponding ones of said two legs;
   each of said end edges and the rubber ring adjacent thereto conjointly defining a transverse plane;
   said inner side of said wheel tire and said transverse plane conjointly defining a first intermediate space;
   said web and said rubber rings having respective end edges facing toward said outer side of said wheel rim;
   said end edges of said web and of said rubber rings facing toward said outer side and said outer side conjointly defining a second interior space;
   said web and said legs being so configured that said rubber rings are arranged inclined with respect to said center plane of said web;
   each of said rubber rings having inner and outer diameters;
   at least one of said rubber rings being subdivided into a first region having a boundary at said inner diameter and a second region having a boundary at said outer diameter and a mid region disposed between said first and second regions; and,
   said first and second regions each being conically shaped regions when viewed in section and said mid region having uniform wall thickness.

2. The rubber-sprung rail wheel of claim 1, wherein said web, starting from said inner side of said wheel tire, has a tapered cross section in a direction toward said outer side of said wheel rim; and, said legs, starting from said outer side of said wheel rim, have a tapered cross section in a direction toward said inner side of said wheel tire.

3. The rubber-sprung rail wheel of claim 2, each of said rubber rings being subdivided into a peripherally-extending first region having a boundary at said inner diameter and a peripherally-extending second region having a boundary at said outer diameter; the first region of each of said rubber rings being conically shaped when viewed in section and widening in a direction toward said boundary thereof; and, the second region of each of said rubber rings being conically shaped when viewed in section and widening in a direction toward said boundary thereof.

4. The rubber-sprung rail wheel of claim 3, wherein said web has a configuration corresponding to an obelisk when viewed in radial section; and, each of said legs corresponds essentially to a half of an obelisk partitioned in its longitudinal direction.

5. The rubber-sprung rail wheel of claim 2, wherein said legs and said rubber rings are arranged to be mirror symmetrical to said center plane.

6. The rubber-sprung rail wheel of claim 2, wherein said rubber rings are vulcanized to said web.

7. The rubber-sprung rail wheel of claim 2, further comprising a wheel disc defining a first one of said legs of said wheel rim; said wheel rim having a rim ring defining a second one of said legs; and, attachment means for releasably attaching said wheel rim to said wheel disc.

\* \* \* \* \*